(12) United States Patent
Takeda

(10) Patent No.: US 10,946,806 B2
(45) Date of Patent: Mar. 16, 2021

(54) MESH POCKET FOR VEHICLE

(71) Applicant: HONDA ACCESS CORP., Niiza (JP)

(72) Inventor: Shinnosuke Takeda, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 70 days.

(21) Appl. No.: 16/362,047

(22) Filed: Mar. 22, 2019

(65) Prior Publication Data
US 2019/0291654 A1   Sep. 26, 2019

(30) Foreign Application Priority Data
Mar. 26, 2018 (JP) .............................. JP2018-057868

(51) Int. Cl.
*B60R 11/00* (2006.01)

(52) U.S. Cl.
CPC ....... *B60R 11/00* (2013.01); *B60R 2011/0012* (2013.01); *B60R 2011/0042* (2013.01)

(58) Field of Classification Search
CPC . B60R 7/005; B60R 11/00; B60R 2011/0005; B60R 2011/0007; B60R 2011/0019; B60R 2011/0042; B60R 2011/0059
See application file for complete search history.

(56) References Cited

U.S. PATENT DOCUMENTS

| | | | | |
|---|---|---|---|---|
| 6,550,654 B1* | 4/2003 | Crago | ............... | B60R 7/005 224/275 |
| 2004/0217140 A1* | 11/2004 | Zola | ............... | B62J 9/21 224/420 |
| 2004/0239136 A1* | 12/2004 | Nolle | ............... | B60R 7/005 296/37.8 |
| 2005/0011922 A1* | 1/2005 | Nolle | ............... | B60R 7/005 224/563 |
| 2008/0145172 A1* | 6/2008 | Sturt | ............... | B60R 7/02 410/118 |
| 2010/0158630 A1* | 6/2010 | Combs, Jr. | ............... | B60R 7/043 410/118 |

(Continued)

FOREIGN PATENT DOCUMENTS

| | | |
|---|---|---|
| DE | 2938357 A1 | 4/1981 |
| JP | 63-161049 U | 10/1988 |

(Continued)

OTHER PUBLICATIONS

Office Action dated Aug. 28, 2019, issued in counterpart JP Application No. 2018-057868, with English translation (6 pages).

*Primary Examiner* — Gregory A Blankenship
(74) *Attorney, Agent, or Firm* — Westerman, Hattori, Daniels & Adrian, LLP

(57) ABSTRACT

A mesh pocket for a vehicle includes a net member, a plurality of hook clips provided on a front face of an interior material, and a fixing member fixing part of the net member to the interior material. In a state in which corner parts of the net member are latched on the plurality of hook clips, part of a lower side of the net member is fixed to the interior material by the fixing member. Accordingly, even when the net member is detached from the hook clip when not in use, due to part of the net member being fixed to the interior material there is no possibility that it will be lost and, moreover, since a shopping bag, etc. can be hung on the hook clip, from which the net member is detached, the convenience can be improved.

10 Claims, 6 Drawing Sheets

(56) References Cited

U.S. PATENT DOCUMENTS

| | | | | |
|---|---|---|---|---|
| 2013/0256498 A1* | 10/2013 | Antonioni | ............... | A47G 29/08 |
| | | | | 248/560 |
| 2015/0343955 A1* | 12/2015 | Emde | .................... | B60P 7/0876 |
| | | | | 410/118 |
| 2018/0290599 A1* | 10/2018 | Emde | ....................... | B60R 7/005 |
| 2019/0291654 A1* | 9/2019 | Takeda | .................... | B60R 7/005 |

FOREIGN PATENT DOCUMENTS

| | | |
|---|---|---|
| JP | 9-86252 A | 3/1997 |
| JP | 11-091447 A | 4/1999 |

\* cited by examiner

MESH POCKET FOR VEHICLE

CROSS REFERENCE TO RELATED APPLICATIONS

The present application claims priority under 35 U.S.C. § 119 to Japanese Patent Application No. 2018-57868 filed Mar. 26, 2018 the entire contents of which are hereby incorporated by reference.

BACKGROUND OF THE INVENTION

Field of the Invention

The present invention relates to a mesh pocket for a vehicle, comprising a net member that is stretched over a front face of an interior material of the vehicle and housing an article between the net member and the front face of the interior material.

Description of the Related Art

Japanese Utility Model Application Laid-open No. 63-161049 has made known a trunk side pocket that forms a housing for an article between a net made of a stretchable rubbery material and a recessed part by mounting a trim having the recess part on an inner wall of an automobile trunk and fixing and hooking an outer peripheral part of the net on a plurality of hooks provided along the edge of the trim.

Furthermore, Japanese Patent Application Laid-open No. 9-86252 has made known a seat back pocket forming a housing for an article between a net part and a back face of a seat back for an automobile seat, in which a pocket part housing a small item includes an elastic frame body on its outer periphery, a net part that is integrally continuous with the inner side of the elastic frame body, and a mounting tool that is insertion molded at a plurality of positions of the elastic frame body, the mounting tool being fixed to the back face of the seat back, is known from.

However, in the conventional arrangements, since no consideration is given to housing or storing the net removed from the trim of the trunk when not in use or the pocket part removed from the seat back, not only is there a possibility that the net or the pocket part will be lost during storage, but also there is no function for hanging a shopping bag, etc. in the place that the net or the pocket part has been removed from, and there is the problem that convenience is lacking.

SUMMARY OF THE INVENTION

The present invention has been accomplished in light of the above circumstances, and it is an object thereof to provide a mesh pocket for a vehicle that does not give rise to the possibility of losing a detachable net member when it is removed and, moreover, that has the function of enabling a shopping bag, etc. to be hung when the net member is not used.

In order to achieve the object, according to a first aspect of the present invention, there is provided a mesh pocket for a vehicle, comprising a net member that is stretched over a front face of an interior material of the vehicle and housing an article between the net member and the front face of the interior material, wherein the mesh pocket further comprises a plurality of hook clips provided on the front face of the interior material and a fixing member fixing part of the net member to the interior material, and in a state in which corner parts of the net member are latched on the plurality of hook clips, part of a lower side of the net member is fixed to the interior material by the fixing member.

In accordance with the first aspect, since the mesh pocket for a vehicle includes the net member, the plurality of hook clips provided on the front face of the interior material, and the fixing member fixing part of the net member to the interior material, and in a state in which the corner parts of the net member are latched on the plurality of hook clips, part of the lower side of the net member is fixed to the interior material by the fixing member, even when the net member is detached from the hook clip when not in use, due to part of the net member being fixed to the interior material there is no possibility that it will be lost and, moreover, since a shopping bag, etc. can be hung on the hook clip, from which the net member is detached, the convenience can be improved.

According to a second aspect of the present invention, in addition to the first aspect, in a state in which the corner parts of the net member are latched on the plurality of hook clips, a lower side of the net member is disposed in a horizontal direction, and a middle part of the lower side is fixed to the interior material by the fixing member.

In accordance with the second aspect, since in a state in which the corner parts of the net member are latched on the plurality of hook clips, the lower side of the net member is disposed in the horizontal direction, and the middle part of the lower side is fixed to the interior material by the fixing member, when the net member is detached from the hook clip, the net member hangs down evenly on both sides of the fixing member, thus improving the appearance.

According to a third aspect of the present invention, in addition to the first or second aspect, the fixing member is a latching pin that latches on a U-shaped portion of the net member that is drawn in toward a reverse side from the front face side of the interior material.

In accordance with the third aspect, since the fixing member is a latching pin that latches on the U-shaped portion of the net member that is drawn in toward the reverse side from the front face side of the interior material, it is possible to fix the net member on the reverse face side of the interior material wall inconspicuously and strongly.

According to a fourth aspect of the present invention, in addition to the first or second aspect, the net member comprises a network body and an annular cord body having elasticity and extending through an outer peripheral part of the network body so as to weave through the outer peripheral part, the network body is fixed to the front face of the interior material in a deployed state by latching the annular cord body on the plurality of hook clips, and the annular cord body is fixed to the interior material.

In accordance with the fourth aspect, since the net member includes the network body and the annular cord body having elasticity and extending through the outer peripheral part of the network body so as to weave through it, the network body is fixed to the front face of the interior material in a deployed state by latching the annular cord body on the plurality of hook clips, and the annular cord body is fixed to the interior material, not only does the network body when deployed in use exhibit the function of retaining an article effectively, but it is also possible to compactly gather up the network body by sliding it toward the tip end of the annular cord body when not in use.

According to a fifth aspect of the present invention, in addition to the fourth aspect, the interior material is a plate-shaped garnish disposed within a vehicle compartment, and the net member is housed on the reverse face of the plate-shaped garnish in a state in which the network body is drawn up and bunched together on a tip end part of the annular cord body.

In accordance with the fifth aspect, since the interior material is a plate-shaped garnish disposed within the vehicle compartment, and the net member is housed on the reverse face of the plate-shaped garnish in a state in which the network body is drawn up and bunched together on the tip end part of the annular cord body, due to the net member being hidden on the reverse side of the plate-shaped garnish when not in use, not only does the net member not get in the way, but also the appearance is not impaired.

According to a sixth aspect of the present invention, in addition to the fifth aspect, the plate-shaped garnish is a center console garnish facing a passenger seat side, and the net member is housed in a space between the center console garnish and a center tunnel.

In accordance with the sixth aspect, since the plate-shaped garnish is a center console garnish facing the passenger seat side, and the net member is housed in a space between the center console garnish and the center tunnel, not only does the ease of use improve due to the net member or the hook clip being positioned around the foot of an occupant on the passenger seat, but the appearance also improves due to the net member being hidden on the reverse side of the center console garnish when not in use as well as it not getting in the way.

Note that a center console garnish 14 of an embodiment corresponds to the plate-shaped garnish or the interior material of the present invention, and a latching pin 21 of the embodiment corresponds to the fixing member of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below based on FIG. 1 to FIG. 6C.

Figure 1:
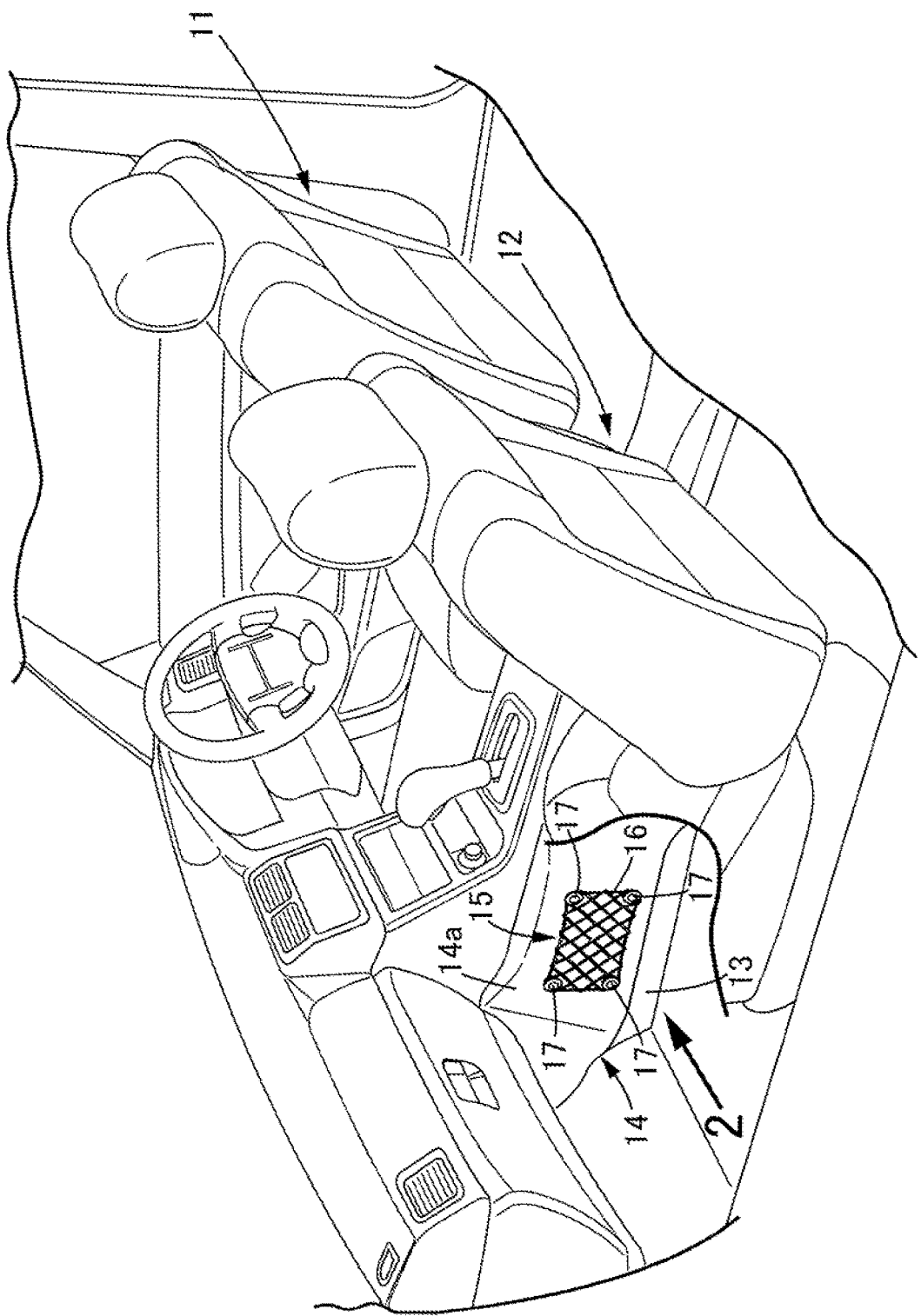
FIG. 1 is a perspective view of an interior of a vehicle compartment of an automobile.

As shown in FIG. 1, a center tunnel 13 extends in the fore-and-aft direction so as to cross between a driver's seat 11 and a passenger seat 12 disposed in a vehicle compartment of an automobile, and a mesh pocket 15 for housing a small article such as for example a cell phone is provided on a side wall 14a, on the passenger seat 12 side, of a center console garnish 14 covering an upper half of the center tunnel 13.

As shown in FIG. 2 to FIG. 5, the mesh pocket 15 includes a stretchable net member 16 and four hook clips 17 for mounting it to the side wall 14a of the center console garnish 14. The net member 16 is formed from an annular cord body 18 formed into an annular shape from a rubber cord having elasticity, etc. and a network body 19 formed into a rectangular net shape from a rubber cord having elasticity, etc., and the annular cord body 18 extends through an outer peripheral part of the network body 19 so as to weave through it. Therefore, when the network body 19 is spread, it is deployed into a planar shape so as to be surrounded by the annular cord body 18, and sliding the network body 19 in one direction along the annular cord body 18 enables it to be gathered up and bunched together.

The annular cord body 18 is fixed to a mounting hole 14b formed in the side wall 14a of the center console garnish 14 by extending part of the annular cord body 18 through the mounting hole 14b of the side wall 14a from the front side to the reverse side and, moreover, inserting a latching pin 21 into a U-shaped portion 18a of the annular cord body 18 extending through a washer 20 on the reverse side of the side wall 14a. In this way, since the U-shaped portion 18a of the net member 16 drawn into the reverse face side from the front face side the side wall 14a of the center console garnish 14 is latched by means of the latching pin 21, it is possible to fix the net member 16 on the reverse face side of the side wall 14a inconspicuously and strongly.

The four hook clips 17 are identical members, each hook clip 17 including a disk-shaped hook main body 22 having formed in its outer periphery an annular groove 22a and having a bolt hole 22b extending through its center, a cosmetic cap 23 detachably covering the bolt hole 22b of the hook main body 22, a spacer rubber 24, and a washer 25. The hook clip 17 is mounted by screwing and fastening a nut 27 around a bolt 26 that is inserted through the bolt hole 22b of the hook main body 22 disposed on the front face side of the side wall 14a of the center console garnish 14, the spacer rubber 24, a bolt hole 14c of the side wall 14a, and the washer 25 and then fitting the cosmetic cap 23 in the bolt hole 22b of the hook main body 22.

The four hook clips 17 are disposed at positions corresponding to four apexes of a rectangle on the front face of the side wall 14a of the center console garnish 14, and the mounting hole 14b for the annular cord body 18 is positioned at a middle position of the lower side of the rectangle.

The operation of the embodiment of the present invention having the above arrangement is now explained.

Figure 2:
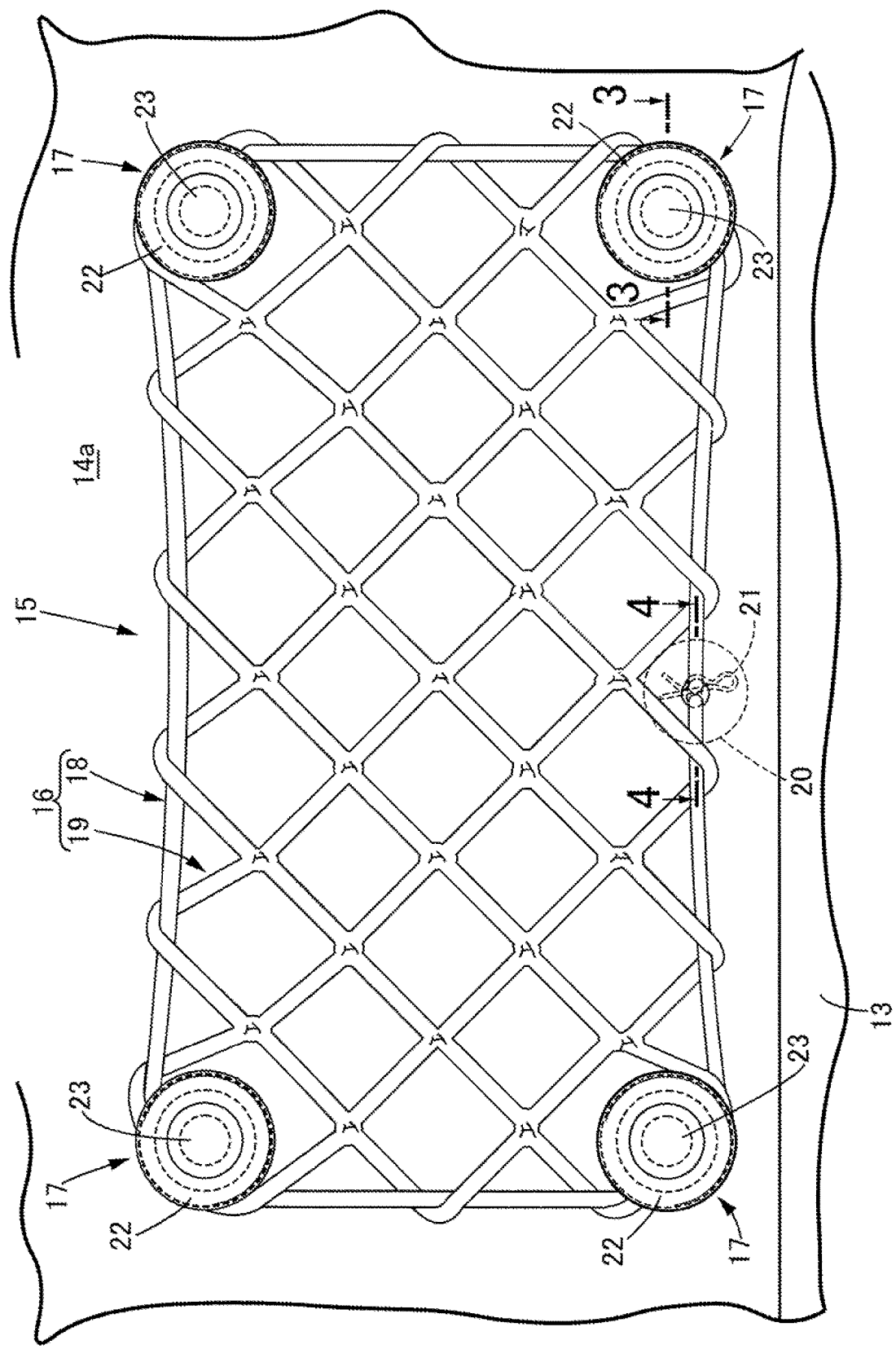
FIG. 2 is an enlarged view from a direction of arrow 2 in FIG. 1.
Figure 3:
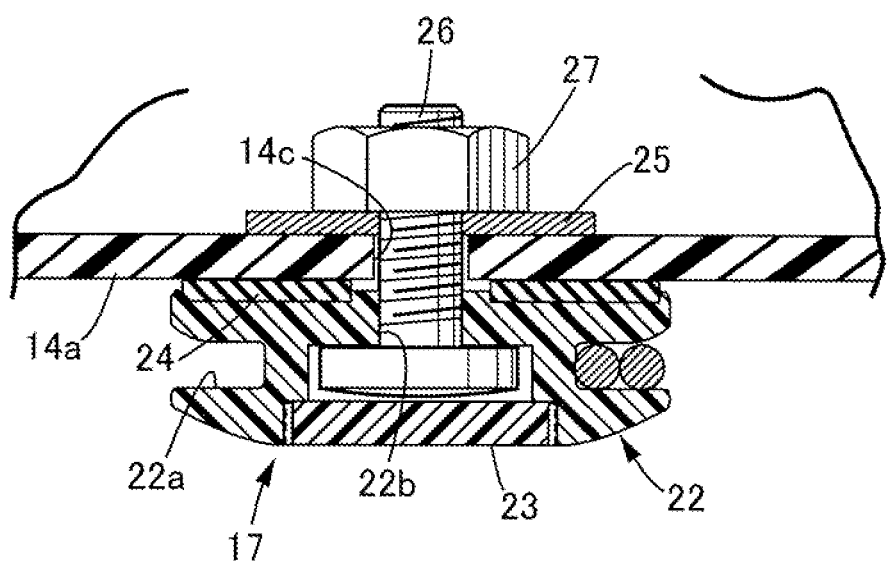
FIG. 3 is an enlarged sectional view along line 3-3 in FIG. 2.
Figure 4:
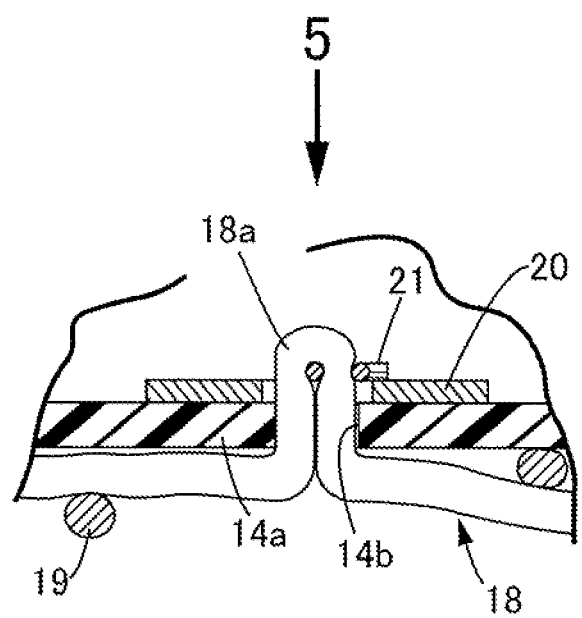
FIG. 4 is an enlarged sectional view along line 4-4 in FIG. 2.
Figure 5:
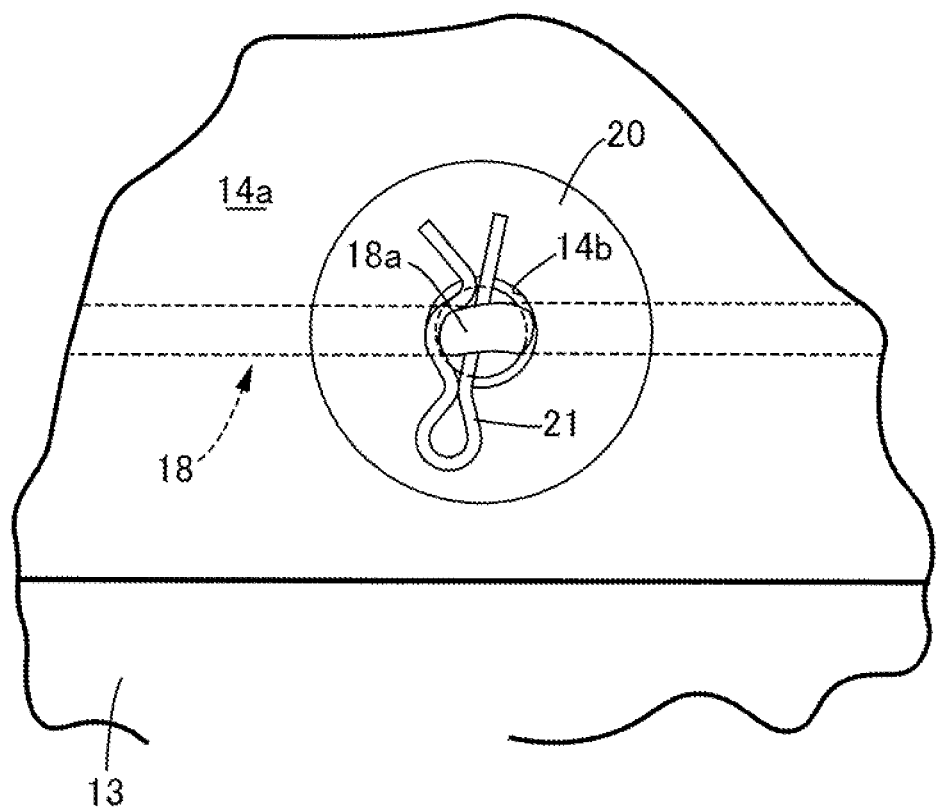
FIG. 5 is a view from a direction of arrow 5 in FIG. 4.

As shown in FIG. 2, in order to mount the net member 16 of the mesh pocket 15 on the side wall 14a of the center console garnish 14, in a state in which the network body 19 is evenly spread over the entire length of the annular cord body 18, the annular cord body 18 may be latched on the annular grooves 22a of the hook main bodies 22 of the four hook clips 17 while pulling and stretching it. In this state, since the net member 16 is deployed into a rectangular shape so as to straddle the four hook clips 17, the net member 16 can house a small article inserted through a gap formed by pulling the upper side thereof, so as to sandwich it between itself and the side wall 14a of the center console garnish 14.

In this process, since the middle part of the annular cord body 18, which follows the lower side of the network body 19 deployed into a rectangular shape, is fixed to the mounting hole 14b of the side wall 14a of the center console garnish 14, it is possible to prevent a small article housed therein from falling out from the lower side of the net member 16. Moreover, since the mesh pocket 15 is positioned around the foot of an occupant on the passenger seat 12, not only does the ease of use improve, but also it does not get in the way.

Figure 6A:
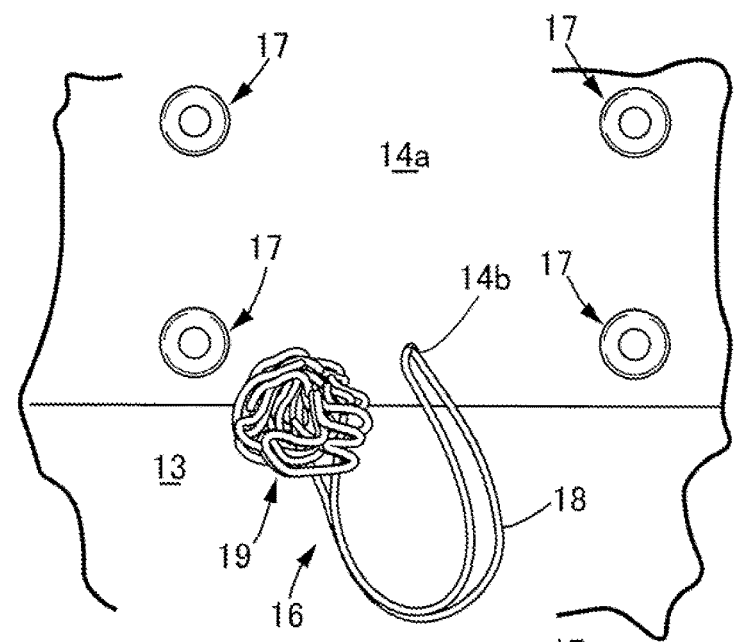
FIGS. 6A to 6C are operation explanatory views of a mesh pocket.
Figure 6B:
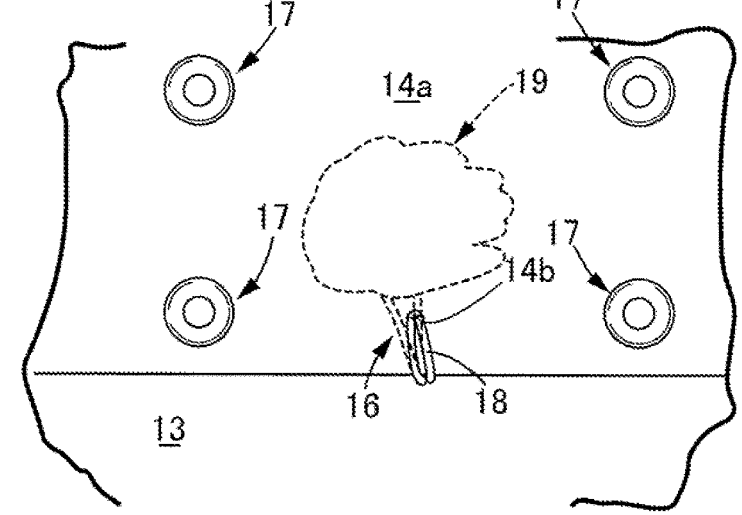

As shown in FIG. 6A and FIG. 6B, when the net member 16 of the mesh pocket 15 is not used, the annular cord body 18 is removed from the four hook clips 17, the network body 19 is slid toward the tip end side of the annular cord body 18 (the side further from the mounting hole 14b of the side wall 14a), gathered up in a compact manner, and then housed on the reverse face of the side wall 14a via a gap of the lower edge of the side wall 14a of the center console garnish 14. Since in a mounted state the lower side of the net member 16 is disposed in the horizontal direction, and the middle part of the lower side is fixed to the mounting hole 14b of the side wall 14a by means of the latching pin 21, when the net member 16 is detached from the hook clips 17, the net member 16 hangs down evenly on both sides of the latching pin 21, thus improving the appearance.

Figure 6C:
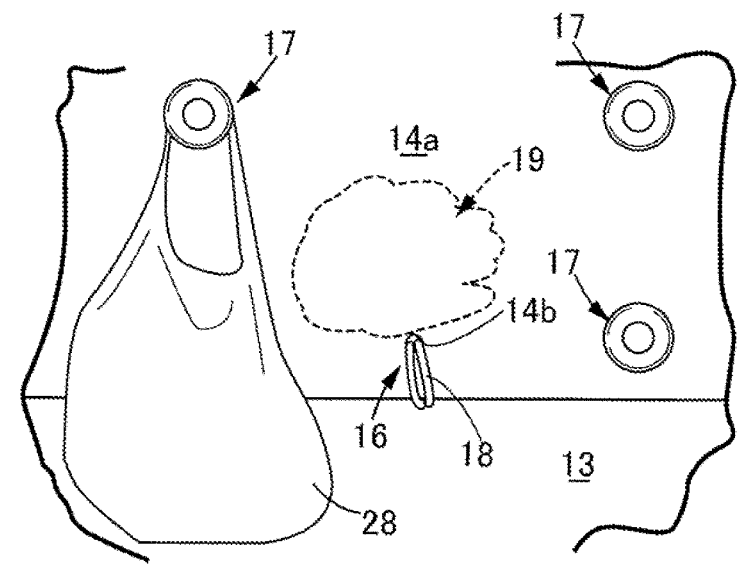

As described above, since the net member 16 of the mesh pocket 15 not in use is housed on the reverse face of the side wall 14a of the center console garnish 14, not only does the net member 16 not get in the way, but the appearance is also improved due to it being hidden on the reverse face of the center console garnish 14. Moreover, since the net member 16 not in use is linked to the center console garnish 14 via the annular cord body 18, there is no possibility that the net member 16 will be lost during storage. Furthermore, as shown in FIG. 6C, since a shopping bag 28, etc. can be hung by utilizing the annular groove 22a of the hook main body 22 of the hook clip 17 after removing the annular cord body 18, the convenience is improved.

An embodiment of the present invention is explained above, but the present invention may be modified in a variety of ways as long as the modifications do not depart from the gist of the present invention.

For example, the location where the mesh pocket 15 is mounted is not limited to the side wall 14a of the center console garnish 14 as in the embodiment, and it may be any location such as the back face of a seat back, a trim of a door, or the like.

What is claimed is:

1. A mesh pocket for a vehicle, comprising a net member that is stretched over a front face of an interior material of the vehicle and housing an article between the net member and the front face of the interior material,
    wherein the mesh pocket further comprises a plurality of hook clips provided on the front face of the interior material and a fixing member fixing part of the net member to the interior material, and in a state in which corner parts of the net member are latched on the plurality of hook clips, part of a lower side of the net member is fixed to the interior material by the fixing member,
    wherein the fixing member is a latching pin that latches on a U-shaped portion of the net member that is drawn in toward a reverse side from the front face side of the interior material.

2. The mesh pocket for a vehicle according to claim 1, wherein the net member comprises a network body and an annular cord body having elasticity and extending through an outer peripheral part of the network body so as to weave through the outer peripheral part, the network body is fixed to the front face of the interior material in a deployed state by latching the annular cord body on the plurality of hook clips, and the annular cord body is fixed to the interior material.

3. The mesh pocket for a vehicle according to claim 2, wherein the interior material is a plate-shaped garnish disposed within a vehicle compartment, and the net member is housed on the reverse face of the plate-shaped garnish in a state in which the network body is drawn up and bunched together on a tip end part of the annular cord body.

4. The mesh pocket for a vehicle according to claim 3, wherein the plate-shaped garnish is a center console garnish facing a passenger seat side, and the net member is housed in a space between the center console garnish and a center tunnel.

5. A mesh pocket for a vehicle, comprising a net member that is stretched over a front face of an interior material of the vehicle and housing an article between the net member and the front face of the interior material,
    wherein the mesh pocket further comprises a plurality of hook clips provided on the front face of the interior material and a fixing member fixing part of the net member to the interior material, and in a state in which corner parts of the net member are latched on the plurality of hook clips, part of a lower side of the net member is fixed to the interior material by the fixing member,
    wherein in a state in which the corner parts of the net member are latched on the plurality of hook clips, a lower side of the net member is disposed in a horizontal direction, and a middle part of the lower side is fixed to the interior material by the fixing member, and
    wherein the fixing member is a latching pin that latches on a U-shaped portion of the net member that is drawn in toward a reverse side from the front face side of the interior material.

6. The mesh pocket for a vehicle according to claim 5, wherein the net member comprises a network body and an annular cord body having elasticity and extending through an outer peripheral part of the network body so as to weave through the outer peripheral part, the network body is fixed to the front face of the interior material in a deployed state by latching the annular cord body on the plurality of hook clips, and the annular cord body is fixed to the interior material.

7. The mesh pocket for a vehicle according to claim 6, wherein the interior material is a plate-shaped garnish disposed within a vehicle compartment, and the net member is housed on the reverse face of the plate-shaped garnish in a state in which the network body is drawn up and bunched together on a tip end part of the annular cord body.

8. The mesh pocket for a vehicle according to claim 7, wherein the plate-shaped garnish is a center console garnish facing a passenger seat side, and the net member is housed in a space between the center console garnish and a center tunnel.

9. A mesh pocket for a vehicle, comprising a net member that is stretched over a front face of an interior material of the vehicle and housing an article between the net member and the front face of the interior material,
    wherein the mesh pocket further comprises a plurality of hook clips provided on the front face of the interior material and a fixing member fixing part of the net member to the interior material, and in a state in which corner parts of the net member are latched on the plurality of hook clips, part of a lower side of the net member is fixed to the interior material by the fixing member,
    wherein the net member comprises a network body and an annular cord body having elasticity and extending through an outer peripheral part of the network body so as to weave through the outer peripheral part, the network body is fixed to the front face of the interior material in a deployed state by latching the annular cord body on the plurality of hook clips, and the annular cord body is fixed to the interior material, wherein the interior material is a plate-shaped garnish disposed within a vehicle compartment, and the net member is housed on the reverse face of the plate-shaped garnish in a state in which the network body is drawn up and bunched together on a tip end part of the annular cord body.

10. The mesh pocket for a vehicle according to claim 9, wherein the plate-shaped garnish is a center console garnish facing a passenger seat side, and the net member is housed in a space between the center console garnish and a center tunnel.

\* \* \* \* \*